(12) United States Patent
Komori et al.

(10) Patent No.: US 6,642,163 B2
(45) Date of Patent: Nov. 4, 2003

(54) CRT FUNNEL OF A NON BEAM-INDEX TYPE

(75) Inventors: Hiroshi Komori, Otsu (JP); Hiroki Yamazaki, Koga-gun (JP)

(73) Assignee: Nippon Electric Glass Co., Ltd., Ostu (JP)

( * ) Notice: Subject to any disclaimer, the term of this patent is extended or adjusted under 35 U.S.C. 154(b) by 26 days.

(21) Appl. No.: 10/034,071

(22) Filed: Dec. 20, 2001

(65) Prior Publication Data

US 2002/0115552 A1 Aug. 22, 2002

(30) Foreign Application Priority Data

Dec. 25, 2000 (JP) ........................................ 2000-392405
Oct. 10, 2001 (JP) ........................................ 2001-312949

(51) Int. Cl.[7] ..................... C03C 3/102; C03C 3/105; H01J 29/86
(52) U.S. Cl. ....................... 501/60; 501/62; 501/64; 501/69; 501/70; 313/480; 313/493
(58) Field of Search .................... 501/64, 60, 62, 501/69, 70, 72; 313/480, 493, 636

(56) References Cited

U.S. PATENT DOCUMENTS

| | | | |
|---|---|---|---|
| 3,422,298 A | * | 1/1969 | DeGier ........................ 313/478 |
| 4,065,696 A | | 12/1977 | Steierman |
| 4,174,490 A | * | 11/1979 | Van Erk et al. ............. 313/480 |
| 4,520,115 A | * | 5/1985 | Speit et al. .................... 501/60 |
| 4,737,475 A | | 4/1988 | Thomas et al. |
| 5,192,718 A | * | 3/1993 | Danielson ..................... 501/60 |
| 5,952,767 A | * | 9/1999 | Kuwabara et al. ........... 313/2.1 |
| 6,096,670 A | | 8/2000 | Lautenschlager et al. |
| 6,128,924 A | | 10/2000 | Dorfeld et al. |
| 6,251,811 B1 | * | 6/2001 | Yanagisawa et al. ......... 501/60 |

FOREIGN PATENT DOCUMENTS

| | | |
|---|---|---|
| EP | 0 657 392 | 6/1995 |
| GB | 1 397 348 | 6/1975 |
| GB | 1 433 907 | 4/1976 |
| JP | 8-31342 | 2/1996 |
| JP | 08-290940 | 11/1996 |

* cited by examiner

*Primary Examiner*—David Sample
(74) *Attorney, Agent, or Firm*—Collard & Roe, P.C.

(57) ABSTRACT

A CRT funnel of a non beam-index type is made of a lead glass which contains 10–30 mass % of PbO and has an X-ray absorption coefficient of 40 $cm^{-1}$ or more at 0.6 Å. The lead glass further contains $Sb_2O_3$ and an additive including at least one of $CeO_2$ and $SnO_2$. In case where the additive includes $CeO_2$, it is preferable that the content of $CeO_2$ is not smaller than 0.01 mass % and is smaller than 0.5 mass %. In case where the additive includes $SnO_2$, the content of $SnO_2$ preferably falls within a range of 0.001–2 mass %.

17 Claims, 1 Drawing Sheet

CRT FUNNEL OF A NON BEAM-INDEX TYPE

BACKGROUND OF THE INVENTION

This invention relates to a funnel for use in a CRT (cathode ray tube) of a non beam-index type.

An envelope of a CRT comprises a panel portion for projecting video images, a tubular neck portion with an electron gun arranged therein, and a flare-shaped funnel portion connecting the panel portion and the neck portion. Electron beams emitted from the electron gun excite phosphors arranged on an inner surface of the panel portion to emit light so that the video images are projected on the panel portion. At this time, X-rays bremsstrahlung are produced inside the CRT. Therefore, the envelope of the type is required to have a high X-ray absorbability.

A funnel glass is used for the funnel portion. The funnel glass used for the envelope of the CRT is generally referred to as a CRT funnel glass.

In view of the above, the funnel glass is made of a lead glass which contains 10–30 mass % of PbO high in X-ray absorbability and which has an X-ray absorption coefficient of 40 cm$^{-1}$ or more at 0.6 Å.

Such CRTs are classified broadly into a non beam-index type and a beam-index type. In recent years, following the increase in production amount and size of the CRT of the non beam-index type, there arises a shortage of glass parts. In particular, the funnel glass tends to be broken during an assembling process of the CRT. Therefore, the shortage is serious for the funnel glass as compared with other parts and the increase in production amount is in a strong demand.

In order to increase the production amount, an additional melting furnace must be newly installed. However, such new installation of the additional melting furnace results in a high cost and is not preferable.

In view of the above, it is proposed to increase a glass pull rate in an existing melting furnace without newly installing the additional melting furnace. However, if the glass pull rate is increased, a residence time of a glass within the melting furnace is shortened so that the glass is formed into a glass product without being subjected to sufficient fining within the melting furnace. In this event, the number of seeds in the glass product is increased and a product yield or a production efficiency is degraded.

In order to increase the glass pull rate in the melting furnace and to reduce the number of seeds in the glass product, the content of $Sb_2O_3$ as a fining agent for a CRT glass must be increased. However, since $Sb_2O_3$ is a high environmental load substance, a greater content than that used at present is unfavorable.

In view of the above, proposal is made of a technique of reducing the number of seeds in the glass by addition of $CeO_2$ to $Sb_2O_3$. For example, Japanese Unexamined Patent Publication No. 8-31342 (JP 8-31342 A) discloses a CRT funnel made of a lead glass containing $Sb_2O_3$ and $CeO_2$. However, the funnel disclosed therein is for use in a beam-index type CRT. In the CRT of this type, coloring of a funnel glass by X rays produced in the CRT results in reduction in indexing beams detected by a photodetector device so that the performance of the CRT is deteriorated. The addition of $CeO_2$ in the above-mentioned publication aims to solve such problem due to the X-ray coloring inherent to the beam-index type CRT funnel. Thus, the glass disclosed therein contains a large amount of $CeO_2$. In addition, the CRT funnel of the beam-index type is a small-sized model not greater than 6 inches and is very small in quantity of production. Therefore, the glass pull rate is small so that the residence time of the glass in the melting furnace is extended. As a result, irrespective of the amount of the fining agent, sufficient fining is performed. In this connection, the above-mentioned publication does not suggest an appropriate type and an appropriate type of the fining agent in case where the glass pull rate is increased.

SUMMARY OF THE INVENTION

It is therefore an object of this invention to provide a CRT funnel of a non beam-index type having an excellent seed free grade by enabling the increase in glass pull rate in a production process without requiring the increase in content of $Sb_2O_3$.

Other objects of the present invention will become clear as the description proceeds.

According to an aspect of this invention, there is provided a CRT funnel of a non beam-index type, made of a lead glass which contains 10–30 mass % of PbO, which has an X-ray absorption coefficient of 40 cm$^{-1}$ or more at 0.6 Å, and which contains $Sb_2O_3$ and an additive comprising at least one of $CeO_2$ and $SnO_2$.

$CeO_2$ and $SnO_2$ have following characteristics. In $CeO_2$, change in valence causes a reaction represented by $2CeO_2 \rightarrow Ce_2O_3 + \frac{1}{2}O_2$ to gradually produce an oxygen gas in a temperature range from about 1000° C. to about 1500° C. In $SnO_2$, change in valence number causes a reaction represented by $SnO_2 \rightarrow SnO + \frac{1}{2}O_2$ in a temperature range higher than the above-mentioned temperature range in $CeO_2$ to produce an oxygen gas in a temperature range from about 1400° C. to about 1600° C. Therefore, by the use of $Sb_2O_3$ and at least one of $CeO_2$ and $SnO_2$ in combination as a fining agent, a fining gas is increased in a wide temperature range. As a consequence, even if a residence time of the glass in a melting furnace is short, a high fineness is kept.

PbO is a component which improves the X-ray absorption coefficient of the glass. However, if the content of PbO is less than 10 mass %, the X-ray absorbability is insufficient. On the other hand, if the content is greater than 30 mass %, the viscosity of the glass is excessively low so that formation is difficult. Preferably, the content of PbO falls within a range of 15–27 mass %.

$Sb_2O_3$ is essential as a fining agent. However, if the content is greater than 2 mass %, the glass tends to be devitrified. Preferably, the content of $Sb_2O_3$ falls within a range of 0.01–1 mass %.

$CeO_2$ is a component required to compensate the shortage of the fining gas in case where the glass pull rate is increased. However, if the content is less than 0.01 mass %, a sufficient effect can not be obtained. On the other hand, the content of 0.5 mass % or more brings about no substantial change in fineness and does not provide the effect corresponding to the increase in raw material cost but the number of seeds may be increased to the contrary. In case where the above-mentioned additive comprises $CeO_2$ alone, the content of $CeO_2$ preferably falls within a range of 0.01–0.45 mass %.

$SnO_2$ is also a component required to compensate the shortage of the fining gas in case where the glass pull rate is increased. If the content is less than 0.001 mass %, a sufficient effect can not be obtained. On the other hand, if the content is greater than 2 mass %, the glass tends to be devitrified. In case where the above-mentioned additive comprises $SnO_2$ alone, the content of $SnO_2$ preferably falls within a range of 0.001–1.5 mass %.

In case where the above-mentioned additive comprises $CeO_2$ and $SnO_2$, it is preferable that the content of $CeO_2$ is not smaller than 0.01 mass % and is smaller than 0.5 mass % and that the content of $SnO_2$ falls within a range of 0.001–2 mass %.

In addition, the lead glass may further contain, in mass %, 48–58% $SiO_2$, 0.5–6% $Al_2O_3$, 0–5% MgO, 0–6% CaO, 0–9% SrO, 0–9% BaO, 3–9% $Na_2O$, 4–11% $K_2O$, 0–5% ZnO, and 0–2% $ZrO_2$.

$SiO_2$ is a component serving as a network former of the glass. If the content is less than 48 mass %, the viscosity of the glass is excessively low so that the formation becomes difficult. If the content is more than 58 mass %, the coefficient of thermal expansion of the glass is excessively low and fails to match the coefficient of thermal expansion of a neck glass. Preferably, the content of $SiO_2$ falls within the range of 49–57 mass %.

$Al_2O_3$ is also a component serving as a network former of the glass. If the content is smaller than 0.5 mass %, the viscosity of the glass is excessively low so that the formation becomes difficult. If the content is greater than 6 mass %, the coefficient of thermal expansion of the glass is excessively low and fails to match the coefficient of thermal expansion of a neck glass. Preferably, the content of $Al_2O_3$ falls within a range of 1–5 mass %.

MgO is a component serving to facilitate melting of the glass and to adjust the coefficient of thermal expansion and the viscosity. If the content is greater than 5 mass %, the glass tends to be devitrified so that the formation becomes difficult. Preferably, the content of MgO is 4 mass % or less CaO, like MgO, is a component serving to facilitate melting of the glass and to adjust the coefficient of thermal expansion and the viscosity. If the content is greater than 6 mass %, the glass tends to be devitrified so that the formation becomes difficult. Preferably, the content of CaO falls within a range of 1–5 mass %.

Each of SrO and BaO is a component serving to facilitate melting of the glass, to adjust the coefficient of thermal expansion and the viscosity, and to improve the X-ray absorbability. If the content of each of SrO and BaO is greater than 9 mass %, the glass tends to be devitrified so that the formation becomes difficult. Preferably, the content of each of SrO and BaO is 7 mass % or less.

$Na_2O$ is a component to adjust the coefficient of thermal expansion and the viscosity. If the content is less than 3 mass %, the coefficient of thermal expansion is excessively low and fails to match the coefficient of thermal expansion of the neck glass. If the content is more than 9 mass %, the viscosity is excessively low so that the formation is difficult. Preferably, the content of $Na_2O$ falls within the range of 4–8 mass %.

$K_2O$, like $Na_2O$, is a component to adjust the coefficient of thermal expansion and the viscosity. If the content is smaller than 4 mass %, the coefficient of thermal expansion is excessively low and fails to match the coefficient of thermal expansion of the neck glass. If the content is greater than 11 mass %, the viscosity is excessively low so that the formation is difficult. Preferably, the content of $K_2O$ falls within the range of 5–10 mass %

ZnO is a component to improve the X-ray absorption coefficient of the glass and to suppress alkali elution. If the content is greater than 5 mass %, generation of devitrifying stones is increased due to volatilization and agglomeration of ZnO. Preferably, the content of ZnO is 4 mass % or less.

$ZrO_2$ is a component to improve the X-ray absorption coefficient of the glass. If the content is greater than 2 mass %, the glass tends to be devitrified so that the formation becomes difficult. Preferably, the content of $ZrO_2$ falls within the range of 0–1.5 mass %.

In addition to the above-mentioned components, other components such as $P_2O_5$ and $B_2O_3$ may be added up to 1 mass % as far as the characteristics of the glass are not degraded.

DESCRIPTION OF PREFERRED EMBODIMENT

Now, a CRT funnel of a non beam-index type according to an embodiment of this invention will be described in detail in conjunction with specific examples.

The CRT funnel is made of a lead glass selected from examples (Samples Nos. 1–8) which are shown in Tables 1 and 2 together with comparative examples (Samples Nos. 9–11). The sample No. 9 shows an existing funnel composition.

TABLE 1

| | Examples | | | | | |
| --- | --- | --- | --- | --- | --- | --- |
| | No. 1 | No. 2 | No. 3 | No. 4 | No. 5 | No. 6 |
| composition (mass %) | | | | | | |
| $SiO_2$ | 52.5 | 55.55 | 50.67 | 52.8 | 52.5 | 53.2 |
| $Al_2O_3$ | 3.3 | 1.0 | 4.8 | 3.0 | 3.3 | 2.0 |
| PbO | 22.8 | 20.0 | 19.0 | 22.0 | 22.8 | 20.0 |
| MgO | 1.9 | 0.5 | 2.0 | 1.5 | 1.9 | 2.5 |
| CaO | 3.8 | 4.0 | 3.0 | 4.0 | 3.8 | 3.5 |
| SrO | 0.6 | 4.0 | 3.0 | 1.0 | 0.6 | — |
| BaO | 0.8 | — | 1.0 | 1.0 | 0.8 | 4.0 |
| $Na_2O$ | 6.3 | 5.0 | 5.5 | 6.5 | 6.3 | 6.0 |
| $K_2O$ | 7.6 | 9.0 | 8.5 | 7.5 | 7.6 | 8.0 |
| ZnO | 0.1 | 0.4 | 2.2 | — | 0.1 | — |
| $ZrO_2$ | — | — | — | — | — | 0.2 |
| $Sb_2O_3$ | 0.2 | 0.1 | 0.3 | 0.5 | 0.2 | 0.1 |
| $CeO_2$ | 0.1 | 0.45 | 0.03 | 0.2 | — | — |
| $SnO_2$ | — | — | — | — | 0.1 | 0.5 |
| Ratio (%) of seeds remaining in the glass | 7 | 7 | 6 | 5 | 8 | 7 |
| X-ray absorption coefficient (0.6 Å,cm$^{-1}$) | 66 | 65 | 63 | 63 | 66 | 61 |

TABLE 2

| | Examples | | Comparative Examples | | |
| --- | --- | --- | --- | --- | --- |
| | No. 7 | No. 8 | No. 9 | No. 10 | No. 11 |
| composition (mass%) | | | | | |
| $SiO_2$ | 54.8 | 52.5 | 52.6 | 53.6 | 55.9 |
| $Al_2O_3$ | 1.0 | 3.3 | 3.3 | 2.0 | 1.0 |
| PbO | 20.0 | 22.8 | 22.8 | 20.0 | 20.0 |
| MgO | 0.5 | 1.9 | 1.9 | 2.5 | 0.5 |
| CaO | 4.0 | 3.8 | 3.8 | 3.5 | 4.0 |
| SrO | 4.0 | 0.6 | 0.6 | — | 4.0 |
| BaO | — | 0.8 | 0.8 | 4.0 | — |
| $Na_2O$ | 5.0 | 6.3 | 6.3 | 6.0 | 5.0 |
| $K_2O$ | 9.0 | 7.6 | 7.6 | 8.0 | 9.0 |
| ZnO | 0.4 | 0.1 | 0.1 | — | 0.4 |
| $ZrO_2$ | — | — | — | — | — |
| $Sb_2O_3$ | 0.3 | 0.2 | 0.2 | — | — |
| $CeO_2$ | — | 0.1 | — | 0.4 | — |

TABLE 2-continued

|  | Examples | | Comparative Examples | | |
| --- | --- | --- | --- | --- | --- |
|  | No. 7 | No. 8 | No. 9 | No. 10 | No. 11 |
| $SnO_2$ | 1.0 | 0.1 | — | — | 0.2 |
| Ratio (%) of seeds remaining in the glass | 4 | 5 | 10 | 11 | 13 |
| X-ray absorption coefficient (0.6 Å, cm$^{-1}$) | 65 | 66 | 66 | 61 | 66 |

Each of the samples given in Tables was prepared in the following manner.

Figure 1:
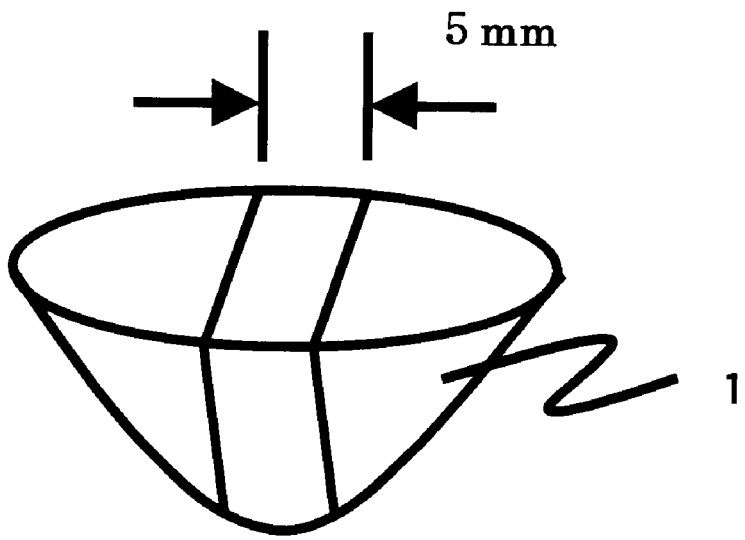
FIG. 1 is a view for describing a method of preparing each sample upon measurement of the ratio of seeds remaining in a glass.
Figure 2:
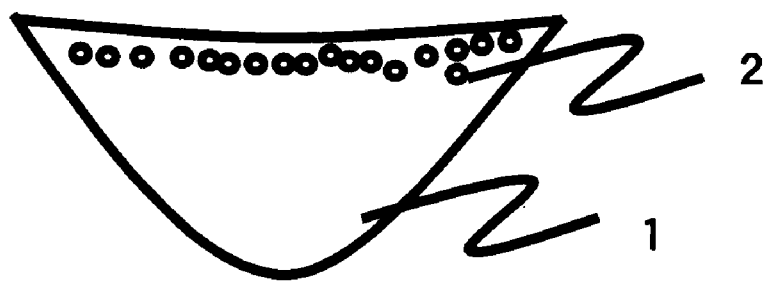
FIG. 2 is a view showing a cut face of the sample.

At first, a material batch in an amount of 100 g prepared to have a glass composition as defined in the Tables was put into a platinum conical crucible and melted at about 1550° C. for 20 minutes. Next, a molten glass was removed from the crucible and gradually cooled to obtain a glass 1 illustrated in FIG. 1. The glass thus prepared was cut into a piece having a thickness of 5 mm. A cut face was subjected to mirror-polishing to obtain the sample having a polished cut face. FIG. 2 shows the cut face of the sample. In the figure, a reference numeral 2 represents seeds remaining in the glass.

For each sample obtained as mentioned above, the ratio of seeds remaining in the glass and the X-ray absorption coefficient were calculated. The results are shown in the Tables.

The ratio of seeds remaining in the glass is calculated in the following manner. An image of the polished cut face of each sample was picked up and was supplied to a computer. By image processing, the ratio of seeds with respect to a sectional area was calculated. A smaller ratio represents quicker seed free and a higher fineness.

The X-ray absorption coefficient was obtained by calculating the absorption coefficient at 0.6 Å with reference to the glass composition and the density.

As is obvious from the Tables, it is understood that, in the samples Nos. 1 through 8 as the examples of this invention, the ratio of seeds remaining in the glass was as small as 7% or less and the seeds were quickly released because these samples contain $CeO_2$ and/or $SnO_2$ in addition to $Sb_2O_3$. Since the content of PbO is 19% or more, the X-ray absorption coefficient was as high as 61 to 66 cm$^{-1}$.

On the other hand, in the samples Nos. 9 through 11 as the comparative examples, the ratio of seeds remaining in the glass was as high as 10% or more because one of $Sb_2O_3$, $CeO_2$ and $SnO_2$ was solely used as a fining agent.

Based on the above-mentioned results, the glass was melted in a practical melting furnace to manufacture a funnel. Then, the number of seeds in a resultant product was counted.

At first, by the use of a glass material having the composition of Sample No. 9 which does not contain $CeO_2$ and $SnO_2$, the funnel was manufactured at a glass pull rate of 100 kg/hr within the melting furnace. In this event, the number of seeds was 0.5/kg. After the glass pull rate was changed into 110 kg/hr, the number of seeds was remarkably increased. Next, the glass pull rate was kept at 110 kg/hr, 0.1% of $CeO_2$ was added to the composition of No. 9 which is thereby modified into the composition of Sample No. 1. In this state, the funnel was manufactured. Then, the number of seeds was decreased to 0.5/kg.

In the similar manner, the funnel was produced after the composition of No. 9 was changed into the composition of No. 5. Then, the number of seeds was 0.5/kg.

Since the lead glass described above has a high fineness, the funnel having a seed free grade equivalent or superior to that of the existing funnel can be manufactured even if the glass pull rate is increased. Therefore, it is possible to solve the problem of shortage of funnels resulting from the increase in production amount or in size.

The CRT funnel of the non beam-index type according to this invention can be obtained by preparing a material batch having a composition within the above-mentioned range, melting the material batch at about 1500° C. to produce a molten glass, forming a glass gob from the molten glass, supplying the glass gob into a molding die, and press forming the glass gob.

What is claimed is:

1. A CRT funnel of a non beam-index type, made of a lead glass which contains 10–30 mass % of PbO, wherein said lead glass has an X-ray absorption coefficient of 40 cm$^{-1}$ or more at 0.6 Å, and which contains $Sb_2O_3$ and $SnO_2$, the content of $SnO_2$ falling within a range of 0.001–2 mass %.

2. The CRT funnel according to claim 1, wherein the content of PbO falls within a range of 15–27 mass %.

3. The CRT funnel according to claim 1, wherein the content of $Sb_2O_3$ falls within a range of 0.01–1 mass %.

4. The CRT funnel according to claim 1, wherein the content of $SnO_2$ falls within a range of 0.001–1.5 mass %.

5. The CRT funnel according to claim 4, wherein said lead glass further comprises $CeO_2$, the content of $CeO_2$ being not smaller than 0.01 mass % and being smaller than 0.5 mass %.

6. The CRT funnel according to claim 5, wherein the content of $CeO_2$ falls within a range of 0.01–0.45 mass % while the content of $SnO_2$ falls within a range of 0.001–1.5 mass %.

7. The CRT funnel according to claim 1, wherein said glass further contains, in mass %, 48–58% $SiO_2$, 0.5–6% $Al_2O_3$, 0–5% MgO, 0–6% CaO, 0–9% SrO, 0–9% BaO, 3–9% $Na_2O$, 4–11% $K_2O$, 0–5% ZnO, and 0–2% $ZrO_2$.

8. The CRT funnel according to claim 7, wherein the content of $SiO_2$ falls within a range of 49–57 mass %.

9. The CRT funnel according to claim 7, wherein the content of $Al_2O_3$ falls within a range of 1–5 mass %.

10. The CRT funnel according to claim 7, wherein the content of MgO is 4 mass % or less.

11. The CRT funnel according to claim 7, wherein the content of CaO falls within a range of 1–5 mass %.

12. The CRT funnel according to claim 7, wherein the content of SrO is 7 mass % or less.

13. The CRT funnel according to claim 7, wherein the content of BaO is 7 mass % or less.

14. The CRT funnel according to claim 7, wherein the content of $Na_2O$ falls within a range of 4–8 mass %.

15. The CRT funnel according to claim 7, wherein the content of $K_2O$ falls within a range of 5–10 mass %.

16. The CRT funnel according to claim 7, wherein the content of ZnO is 4 mass % or less.

17. The CRT funnel according to claim 7, wherein the content of $ZrO_2$ falls within a range of 0–1.5 mass %.

* * * * *